3,078,141
FRACTIONAL PRECIPITATION OF URANIUM FROM URANIUM-VANADIUM CONTAINING CARBONATE LEACH SOLUTION
Robert A. Koble, Bartlesville, Okla., assignor to Phillips Petroleum Company, a corporation of Delaware
No Drawing. Filed Dec. 31, 1959, Ser. No. 863,075
4 Claims. (Cl. 23—14.5)

This invention relates to the recovery of uranium from uranium-bearing materials, such as coffinite, by the carbonate leaching process. More particularly, it relates to the precipitation of soluble uranium values from pregnant carbonate leach solution according to the carbonate leaching process.

An important and widely used hydrometallurgical process for recovering uranium from uranium-bearing material is the "carbonate leaching process." This leaching process has been applied to both primary and secondary uranium mineral deposits, such as pitchblende, coffinite, carnotite, uraninite, tyuyamunite, etc., but it is especially useful in leaching ore of high carbonate content. It is this leaching process that is the concern of the subject invention.

The carbonate leaching process for extracting uranium values from uranium-bearing material comprises contacting crushed uranium bearing ore with hot recycle aqueous alkaline carbonate-bicarbonate solution and, where the material contains uranium in the quadrivalent state, an oxidizing agent such as potassium permanganate or air, to form a slurry of insoluble leached pulp and pregnant leach solution containing the stable, soluble uranyl tricarbonate complex anion. The pregnant leach solution is then separated from the leached pulp for example by multi-stage filtration, and the soluble uranium values precipitated from clarified pregnant leach solution, for example by adding caustic, sodium hydroxide, thereby raising the pH to about pH 12. The precipitate-containing slurry is thickened and the thickened slurry containing the resulting precipitate comprising sodium diuranate (commonly called "yellow cake") is then separated, for example by filtration, and dried. The hydroxide-carbonate solution recovered from thickening operation as overflow is commonly called "barren liquor" and it is regenerated by passing carbon dioxide through it, using for example a supply of waste carbon dioxide such as flue gas. The recarbonated barren liquor is then used as a wash liquid to remove final traces of pregnant leach liquor from the pulp (tailings) and then recycled to the process for reuse in the leaching step.

Other metals and nonmetals are commonly associated with uranium-bearing material. The principal metal commonly associated with uranium-bearing materials is vanadium, although other metals such as zirconium, iron, titanium, barium, aluminum, silicon, antimony, and cobalt, and nonmetallic elements such as phosphorus are also commonly associated with uranium-bearing materials. These other metals and nonmetals, especially vanadium, are commonly extracted with the uranium values in the carbonate leaching step and gradually build up in concentration in the process. For example, a typical secondary uranium ore such as coffinite will contain about 0.25 percent $U_3O_8$ and 0.1 percent $V_2O_5$, and during the leaching step about 10 to 20 percent of the vanadium present in the ore will also be leached. During the subsequent precipitation of the pregnant leach solution with caustic, some of the vanadium values present in the pregnant liquor will also be precipitated together with the uranium values, for example 40 to 60 percent of the $V_2O_5$ present in the pregnant liquor will precipitate with the yellow cake. In fact, up to 85 percent of the vanadium extracted from the ore may appear in the yellow cake produced. The other metals and nonmetals present as impurities in the pregnant liquor will also tend to be precipitated with the yellow cake or become occluded therein. Thus, an impure yellow cake product is often obtained, and, for example, the vanadium content of the yellow cake will often be considerable, e.g., 2 to 7 weight percent.

The presence of these other metals and nonmetals in the yellow cake, especially the presence of vanadium, is undesirable because it renders the subsequent conversion of the yellow cake into uranium metal, or into other uranium compounds such as the hexachloride, much more difficult. The Atomic Energy Commission, a major purchaser of yellow cake produced in this country, penalizes producers of yellow cake if the purity of the yellow cake is not as high as desirable, and it will even refuse to purchase such impure yellow cake. In the case of the vanadium impurity, the Atomic Energy Commission may exact a price penalty if the vanadium content, expressed as $V_2O_5$, exceeds for example 2 weight percent of the $U_3O_8$ in the yellow cake, or the AEC may refuse to buy the yellow cake if the vanadium contaminant content is excessive. In many cases, the vanadium content of the yellow cake may be as high as 6 or 7 percent of the $U_3O_8$ content. Thus, there has arisen a need for an improved method for producing a purer yellow cake, especially a yellow cake having a relatively low vanadium content.

Accordingly, an object of this invention is to provide an improved method for recovering uranium from uranium-bearing materials. Another object is to provide an improved method for precipitating uranium values from pregnant carbonate leach solution in the carbonate leaching process. Another object is to increase the purity of yellow cake produced according to the carbonate leaching process. Another object is to provide an improved method for producing a relatively purer yellow cake having a relatively low vanadium content. Other objects and advantages of this invention will become apparent to those skilled in the art in the following discussion and appended claims.

Briefly stated, the subject invention comprises fractionally precipitating the soluble uranium values present in pregnant carbonate leach liquor in at least two steps. The yellow cake precipitate obtained in the last precipitation step can then be oxidized to solubilize the vanadium values present therein. If the major portion (i.e., greater than 50 percent, preferably 70–85 percent) of the uranium values (measured as $U_3O_8$) is precipitated in a first or primary precipitation step and most of the remaining minor portion of the uranium values is precipitated in a subsequent or secondary precipitation step, the initial yellow cake precipitate obtained by the first precipitation step will have a higher purity than that yellow cake precipitate obtained in the subsequent precipitation step. For example, it has been found in one case that the vanadium content of the initial yellow cake precipitate was only 0.51 percent $V_2O_5$, while the vanadium content of the subsequently formed yellow cake precipitate was 1.42 percent $V_2O_5$.

According to my invention, the clarified pregnant carbonate leach solution, containing the soluble uranyl tricarbonate complex anion, is treated at about 100° to 150° F. in a first precipitation step with caustic to raise the pH of the pregnant liquor to about pH 11.4–12 in order to precipitate a major amount of the uranium values present in the pregnant liquor. The caustic, sodium hydroxide, can be added as a 10–70 percent aqueous solution, and to provide an excess of 0.5 to 1.8 grams of NaOH per liter. Stated another way, the pregnant leach liquor is first treated with a major amount of the caustic necessary to precipitate all the uranium values present in the pregnant leach solution. The resulting yellow cake slurry is then thickened in a thickening zone and the overflow therefrom, which comprises partially depleted pregnant leach solution bearing the remaining unprecipitated soluble uranium values, passed to a second precipitation zone. The thickened slurry resulting from the first precipitation step is passed to a filtration zone for the recovery of the initial or first yellow cake precipitate, and the filtrate resulting from this filtration is then also passed to the second precipitation zone.

All or some of the overflow from the first precipitation step is passed to a second precipitation zone where some or all of the remaining, minor portion of soluble uranium values are precipitated with the balance of the caustic necessary to recover all the uranium values leached from the ore. For example, the amount of secondary caustic will be that sufficient to provide about 1 to 15 grams NaOH per liter of overflow. The yellow cake slurry obtained by this subsequent precipitation step is then thickened in another thickening zone and filtered to obtain the second, relatively impure yellow cake, with the barren liquor from this subsequent precipitation step being recarbonated and recycled to the process. This second yellow cake precipitate is then dried and oxidized at high temperatures to convert the vanadium values present in the yellow cake product to a water soluble vanadate.

Oxidation of the subsequently formed yellow cake precipitate product can be carried out by a roasting step, wherein the impure yellow cake product is mixed with sodium carbonate or sodium chloride and roasted at temperatures in the range of about 600° to 850° C., the amount of sodium carbonate or sodium chloride used ranging from about 5 to 10 parts of salt per 100 parts of yellow cake. Alternatively, the yellow cake product can be simply heated in the presence of air or other free-oxygen containing gas at temperatures sufficient to solubilize the vanadium present in the yellow cake. The oxidized or fused yellow cake, obtained by this treatment, is then leached with water and the leach liquor filtered or otherwise separated to remove the insoluble yellow cake from the aqueous solution of soluble vanadate. The latter may be passed to a disposal pond and the yellow cake product, now substantially free from vanadium impurity, passed to a dryer and packaged.

Where there is a low content of leached vanadium values present in the partially depleted pregnant leach solution after the primary precipitation step, some of this solution can be merely recarbonated and recycled. However, as the content of vanadium values present in this partially depleted leach solution increases and becomes more severe, more or all of it can be sent to the secondary precipitation step for extraction of the vanadium values.

Alternatively, instead of using sodium hydroxide in precipitating the balance of the soluble uranium values present in the partially depleted pregnant liquor, after the precipitation of the major portion of the uranium values, calcium hydroxide or lime can be used in the second precipitation step. After oxidation of the resulting secondary precipitate, and the leaching of vanadium values therefrom, calcium uranate precipitate (or "white cake") can be dried or recycled to the ore grinding or crushing stage.

In another embodiment of this invention, a major portion of the soluble uranium values present in the pregnant leach solution is precipitated in the manner described above, but in the second precipitation step the amount of caustic added is less than all of the caustic necessary to precipitate the balance of the uranium values present in the partially depleted pregnant solution obtained from the first precipitation step, and the second precipitate obtained is recycled to the leaching step, this second precipitate containing a higher vanadium content than that of the first yellow cake precipitate. The further depleted pregnant solution from this second precipitation step will contain a sufficient amount of soluble uranium values to warrant recovery by a third precipitation step, wherein the balance of the caustic necessary to recover the remaining uranium values is added and the third yellow cake precipitate obtained is then odixized in the manner described above.

Still another alternative of the subject invention involves adding to the pregnant carbonate leach solution all of the sodium hydroxide necessary to precipitate all of the uranium values present in the pregnant liquor. Since the complete precipitation of the uranium values generally takes a long period of time, for example 16 hours in a normal commercial plant, the uranium values will slowly precipitate. Accordingly, several minutes to one hour after all the sodium hydroxide is added, and before complete precipitation, the initially formed precipitate, amounting to a major proportion of the uranium values present in the pregnant solution, is separated from the caustic treated pregnant solution. The initially formed precipitate is then recovered and filtered and dried as before. After further elapse of time, the second precipitate which has formed is removed from the precipitation zone and recovered, and after several more hours a third precipitate may be removed and recovered. Additional precipitate may be removed until substantially all of the uranium values present in the initial or original pregnant solution have been precipitated. The impure second, third, and subsequent precipitates can be oxidized in the manner described above, or some of the subsequently formed precipitates can be recycled to the leaching vessel.

The following example further illustrates the objects and advantages of this invention, the data therein being based on a commercial leaching plant for the recovery of uranium values.

In a carbonate leaching process 1 ton of coffinite, a uranium-bearing ore, is ground and leached with 1 ton of aqueous alkaline sodium carbonate-sodium bicarbonate leaching solution. A slurry of leached pulp and pregnant leach solution is withdrawn from the leaching zone and passed to a multi-stage filtration zone comprising a series of three vacuum filters and three alternate repulping troughs. The pregnant leach solution from the filtration zone is passed to a precoated clarifying filter. The clarified pregnant leach solution, comprising 0.54 ton liquor, 3.68 g./l. $U_3O_8$, 0.53 g./l. $V_2O_5$, 24.1 g./l. $Na_2CO_3$, 13.1 g./l. $NaHCO_3$, and 80 g./l. $Na_2SO_4$, is then treated as follows according to the subject invention.

The clarified pregnant leach solution is passed to a first or primary precipitation zone where 7.7 lbs. of NaOH is added, resulting in the precipitation of 65% of the soluble uranium values as a precipitate comprising sodium diuranate. The resulting precipitate-containing slurry is then passed to a separation zone, such as a filtration zone, and the initial or primary yellow cake product separated, thickened, washed and dried. This initial yellow cake amounts to 2.36 lbs. $U_3O_8$ and 0.033 lb. $V_2O_5$ (the latter being 1.4 wt. percent of the $U_3O_8$).

The partially depleted pregnant leach solution recovered from the first precipitation zone comprises 0.166 g./l. $U_3O_8$, 0.51 g./l. $V_2O_5$, 1.6 g./l. NaOH, 40.6 g./l. $Na_2CO_3$, and 80 g./l. $Na_2SO_4$. This pregnant leach solution is passed to a second or secondary precipitation zone where 5.1 lbs. of NaOH is added, resulting in the precipitation of substantially the balance of soluble uranium values remaining in the partially depleted pregnant leach solution. This latter precipitation together with the initial precipitation results in the total precipitation of 98.4% of the $U_3O_8$ present in the initial or clarified pregnant leach solution. The resulting precipitate-containing slurry is passed to a separation zone where secondary, wet yellow cake comprising 1.18 lbs. $U_3O_8$ and 0.282 lb. $V_2O_5$ (the latter being 22.2 wt. percent of the $U_3O_8$) is recovered. The barren liquor from this last separation, containing 0.06 g./l. $U_3O_8$, is recarbonated, recycled as a wash liquid to the pulp filtration zone, and then recycled to the leaching zone.

The second, wet yellow cake product is passed to a roasting zone where it is mixed with 5 to 10 wt. percent $Na_2CO_3$ and oxidized at 820° C., to solubilize the vanadium content. The oxidized yellow cake is then passed to a leaching zone where it is leached with water. The leached slurry comprising 0.277 lb. of soluble vanadium compounds, expressed as $V_2O_5$, and solid yellow cake, comprising 1.18 lb. $U_3O_8$ and 0.005 $V_2O_5$ (the latter being 0.42 wt. percent of the $U_3O_8$) is then passed to a separation and recovery zone where the yellow cake is recovered, washed, and dried, and the aqueous solution of soluble vanadium compounds is passed to disposal.

Various objects of modifications and alterations of this invention will become apparent to those skilled in the art from the foregoing discussion, and it should be understood that the subject invention is not to be unduly limited as set forth herein for illustrative purposes.

I claim:
1. In a carbonate leaching process for recovery of uranium values from uranium- and vanadium-bearing ore, wherein said ore is leached with an alkaline aqueous bicarbonate-carbonate leaching solution, pregnant carbonate leach solution is recovered from the resulting leach slurry, and soluble uranium values are precipitated from said pregnant carbonate leach solution by the addition of sodium hydroxide thereto, the improvement comprising passing said pregnant carbonate leach solution to a first precipitation zone, precipitating a major portion of the soluble uranium values in said pregnant carbonate leach solution by adding thereto a major amount of the sodium hydroxide necessary to precipitate all of said soluble uranium values present in said pregnant carbonate leach solution, separating and recovering the resulting initial preprecipitated uranium values as a first precipitate comprising sodium diuranate from the resulting partially depleted pregnant carbonate leach solution, passing the latter to a second precipitation zone, precipitating substantially the balance of soluble uranium values present in said partially depleted pregnant carbonate leach solution by adding thereto the balance of said sodium hydroxide, and separating and recovering the resulting secondary precipitated uranium values as a second precipitate comprising sodium diuranate and having a vanadium content higher than that of said first precipitate.

2. The process according to claim 1 wherein said secondary precipitated uranium values are passed to a roasting zone to solubilize the vanadium values present therein, the resulting roasted material is then leached with water to dissolve said vanadium values, and the resulting leach solution passed to a separation zone for the recovery of precipitated uranium values having a low vanadium values content.

3. In a carbonate leaching process for recovery of uranium values from uranium- and vanadium-bearing ore, wherein said ore is leached with an alkaline aqueous bicarbonate-carbonate leaching solution, pregnant carbonate leach solution is recovered from the resulting leach slurry, and soluble uranium values are precipitated from said pregnant carbonate leach solution by the addition of sodium hydroxide thereto, the improvement comprising passing said pregnant carbonate leach solution to a first precipitation zone, precipitating a major portion of the soluble uranium values in said pregnant carbonate leach solution by adding thereto a major amount of the sodium hydroxide necessary to precipitate all of said soluble uranium values present in said pregnant carbonate leach solution, separating and recovering the resulting initial preprecipitated uranium values as a first precipitate comprising sodium diuranate from the resulting partially depleted pregnant carbonate leach solution, passing the latter to a second precipitation zone, precipitating a further amount of the uranium values present in said partially depleted pregnant carbonate leach solution by adding a further amount of sodium hydroxide thereto, separating and recovering the resulting secondary precipitated uranium values as a second precipitate comprising sodium diuranate, passing the latter to said leaching zone, passing the further partially depleted pregnant carbonate leach solution to a third precipitation zone, precipitating substantially the balance of uranium values present in said further partially depleted pregnant carbonate leach solution by the addition of sodium hydroxide thereto in an amount sufficient to precipitate substantially the balance of uranium values, and separating and recovering the resulting tertiary precipitated uranium values as a third precipitate comprising sodium diuranate, said second and third precipitates having higher vanadium contents than that of said first precipitate.

4. The process according to claim 3 wherein said tertiary precipitated uranium values are passed to a roasting zone to solubilize the vanadium values present therein, the resulting roasted material is then leached with water to dissolve said vanadium values, and the resulting leach solution passed to a separation zone for the recovery of precipitated uranium values having a low vanadium values content.

References Cited in the file of this patent
UNITED STATES PATENTS

| | | |
|---|---|---|
| 1,129,029 | Vogt | Feb. 16, 1915 |
| 2,176,610 | Stomberg | Oct. 17, 1939 |
| 2,466,118 | Miller et al. | Apr. 5, 1949 |
| 2,654,653 | Nye et al. | Oct. 6, 1953 |
| 2,813,003 | Thunaes et al. | Nov. 12, 1957 |
| 2,856,263 | Carter et al. | Oct. 14, 1958 |
| 2,900,229 | McClaine | Aug. 18, 1959 |

OTHER REFERENCES

Macdonald: "C.E.P. Symposium Series," vol. 50, No. 11, pages 73, 74, May 28, 1954.

Brown et al.: "C.E.P. Symposium Series," vol. 50, No. 13, pages 5-10 (1954).